No. 619,305. Patented Feb. 14, 1899.
I. HIRSCH.
FORK.
(Application filed July 17, 1897.)
(No Model.)
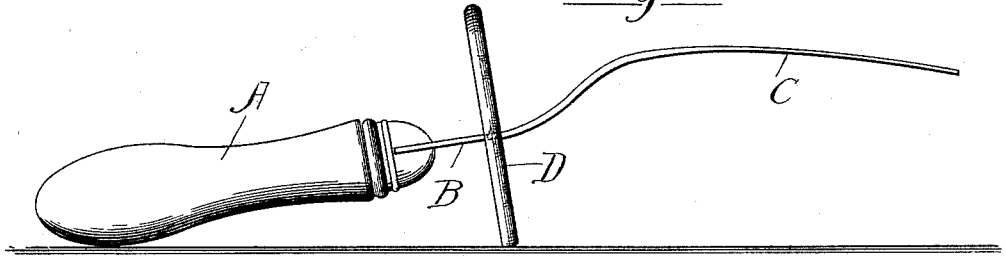
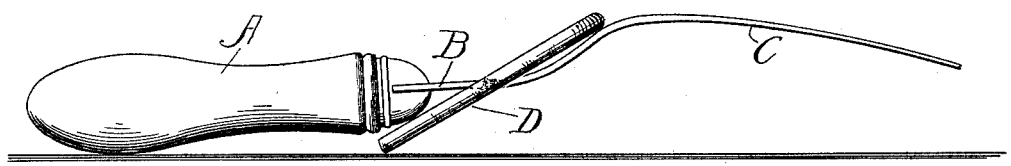
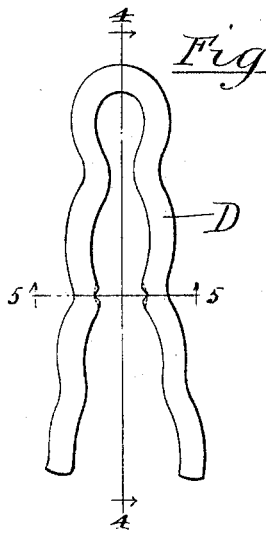
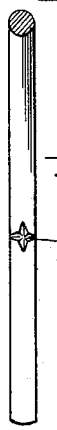
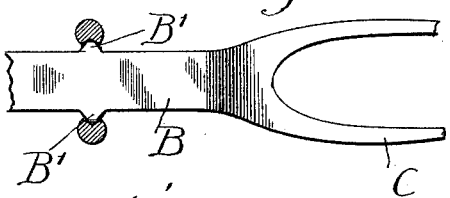
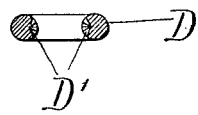
Witnesses
Harold G. Barrett.
Donald M. Carter
Inventor
Isaac Hirsch.

UNITED STATES PATENT OFFICE.

ISAAC HIRSCH, OF CHICAGO, ILLINOIS.

FORK.

SPECIFICATION forming part of Letters Patent No. 619,305, dated February 14, 1899.

Application filed July 17, 1897. Serial No. 644,912. (No model.)

*To all whom it may concern:*

Be it known that I, ISAAC HIRSCH, a citizen of the United States, residing at Chicago, in the county of Cook and State of Illinois, have invented certain new and useful Improvements in Forks, of which the following is a specification.

My invention relates to forks, and has for its object to provide a new and improved fork, of which the following is a description, reference being had to the accompanying drawings, wherein—

Figure 1 is a side elevation of a fork embodying my invention, showing the guard in its operative position. Fig. 2 is a view similar to Fig. 1, showing the guard moved to its inoperative position. Fig. 3 is a view of the guard. Fig. 4 is a sectional view on the line 4 4, Fig. 3. Fig. 5 is a section on the line 5 5, Fig. 3. Fig. 6 is a plan view in cross-section showing the connection between the fork and guard.

Like letters refer to like parts throughout the several figures.

The fork is provided with any suitable handle A, to which is attached the shank B, provided with the prongs or tines C. The shank B and accompanying parts are preferably made from a thin piece of metal, as shown, being stamped out or formed by suitable dies. The shank B is formed with the projections B' B'. A guard D is adapted to be connected with the shank of the fork, so as to protect the hand of the user. This guard may be of any suitable construction and is provided with suitable openings or indentations, which engage the projections B' on the fork-shank. These projections and openings or indentations may be of any suitable form and construction and are preferably so related to each other that the spring of the metal of the guard is utilized in moving and holding the guard in its various positions without the addition of external springs or the like. It is of course evident that the construction of these projections and openings or indentations may be varied and that when they are made of a particular form to operate they might be made to operate by reversing the shapes of the openings and projections—that is, making the projections the shape which the openings formerly had, and vice versa. I have therefore only attempted to set forth one shape of the parts whereby my invention may be utilized.

As illustrated in Fig. 3, the guard consists of wire formed with a series of bends, the wire being provided with two star-shaped indentations or openings D' to receive the projections B' on the shank B. The guard D is preferably made of some material having some elasticity, so that when the arms are spread apart they will tend to return to their normal position. In placing the guard upon the fork the arms or prongs are separated and the star-shaped openings D' brought opposite the projections B'. The guard is then released and in returning to its normal position the openings D' engage the projections B', so as to hold the parts in position.

It is of course evident that all the various parts may be varied in form, construction, and arrangement without departing from the spirit of my invention, and I have only attempted to show one form of my device. I therefore do not wish to be limited to the construction shown.

I have shown and described the openings which receive the projections on the shank as star-shaped openings, as such openings produce the result desired; but it is of course evident that these openings may be of any other suitable shape.

The use and operation of my invention, as illustrated in the drawings, are as follows: When it is desired to use the fork, the guard D is moved to its operative position, as shown in Fig. 1. As the guard is moved from its inoperative to its operative position the star-shaped openings, which are beveled and which vary in depth, cause the arms of the guard to separate during a portion of this movement and then spring back when the guard reaches an upright position. The guard will then be held in this position on account of the shape of these openings and the projections or engaging parts B' on the shank of the fork. When the guard is upright, as shown in Fig. 1, it requires some force to displace it, and after being moved part away toward its inoperative position it will move of its own accord to the position shown in Fig. 2, the spring action of the guard being brought into play. By this construction I am enabled to stamp the shank and prongs of the fork from sheet metal and avoid the expense of casting, forging, or other working, thereby enabling me to produce a very cheap fork with a substantial and satisfactory guard. I may also form the guard in some manner which avoids working—as, for example, by making it of wire. It will also be noted that by this construction I avoid the use of any springs or the like, and hence am enabled to produce at little cost a substantial and satisfactory fork and guard. The star-shaped openings may be formed by punches or the like or in any other suitable manner. When the guard D is made from wire, I may form it with a series of bends, as shown in Fig. 3, in order to increase the spring action of the arms. It will be seen that in this construction the spring action is due to the guard alone.

I claim—

1. A fork, comprising a shank provided with projecting parts, a guard through which said shank extends provided with openings or indentations into which said projections are received, so that said projections act as pivots about which the guard moves, said openings or indentations so shaped that the guard is held in its operative position by its engagement with said projections on the shank.

2. A fork comprising a shank provided with two projections, a guard having two arms between which said shank is received, each arm of said guard provided with a beveled opening, and adapted to engage one of the projections on the shank, the whole so constructed that the distance between the arms of the guard is varied during its movement from its operative to its inoperative position.

3. A fork comprising a shank provided with two projections, a guard having two arms which pass one on each side of said shank, the arms of said guard each provided on its inner surface with a star-shaped opening adapted to engage the projections on the fork-shank.

4. A fork comprising a shank to which the tines are connected, said shank and tines being stamped from a sheet of metal, the shank being provided with two beveled projecting parts, a guard provided with two arms between which the shank is received, said arms being each provided with a beveled opening adapted to engage the projections on the shank, the whole so constructed that the elasticity or spring action of the guard is utilized in holding it in its operative position.

5. A fork comprising a shank having beveled projections thereon, a guard provided with two arms between which the shank is received, said guard made from a piece of wire formed with a series of bends to increase its spring action, a star-shaped opening in each arm of said guard adapted to engage the projections on the fork-shank, said openings being beveled so that the relative positions of the arms of the guard are varied during its movement from its operative to its inoperative position.

ISAAC HIRSCH.

Witnesses:
DONALD M. CARTER,
HOMER L. KRAFT.